(12) United States Patent
Muskat et al.

(10) Patent No.: US 7,703,387 B2
(45) Date of Patent: Apr. 27, 2010

(54) STEAK WEIGHT

(76) Inventors: Michael Muskat, 10061 NW. 3rd St., Plantation, FL (US) 33324; Siva K. Dasan, 5837 NW. 122 Way, Coral Springs, FL (US) 33076

( * ) Notice: Subject to any disclaimer, the term of this patent is extended or adjusted under 35 U.S.C. 154(b) by 1320 days.

(21) Appl. No.: 11/182,198

(22) Filed: Jul. 15, 2005

(65) Prior Publication Data

US 2007/0012195 A1 Jan. 18, 2007

(51) Int. Cl.
*A47J 37/06* (2006.01)

(52) U.S. Cl. .......................... 99/349; 99/353

(58) Field of Classification Search .............. 99/349, 99/353; 15/235.4, 235.5, 235.6, 235.7, 235.8; 16/410, 411; 451/557, 540, 524, 523; 100/910, 100/295; D08/45, 107, 311, 315, 322
See application file for complete search history.

(56) References Cited

U.S. PATENT DOCUMENTS

| 1,507,807 | A | * | 9/1924 | Beeson | 15/235.4 |
|---|---|---|---|---|---|
| 2,241,040 | A | * | 5/1941 | Pringle | 99/341 |
| 2,241,317 | A | * | 5/1941 | Pringle | 99/349 |
| 3,280,662 | A | * | 10/1966 | Frankenfield | 81/488 |
| 3,578,825 | A | * | 5/1971 | Merrow et al. | 403/252 |
| 3,736,859 | A | | 6/1973 | Carlson | |
| 4,305,500 | A | * | 12/1981 | Jaeschke | 206/153 |
| 4,395,948 | A | * | 8/1983 | Monich | 101/405 |
| 4,517,700 | A | * | 5/1985 | Pinto | 15/105 |
| 4,635,538 | A | * | 1/1987 | Polster | 99/349 |
| 5,642,665 | A | * | 7/1997 | Horie | 101/125 |
| 6,099,441 | A | * | 8/2000 | Bonnet | 482/93 |
| 6,138,318 | A | * | 10/2000 | Pyatt et al. | 15/235.4 |
| 2004/0074398 | A1 | | 4/2004 | Griffin et al. | |

* cited by examiner

Primary Examiner—Reginald L Alexander
(74) Attorney, Agent, or Firm—Greenberg Traurig, P.A.

(57) ABSTRACT

The present invention is a steak weight having a single-piece triangular design comprising a rigid bottom plate portion having two opposite side portions disposed upwardly and inwardly joining above the central portion of said bottom plate portion to form a durable handle portion with each of said side portions having a slot for the user to insert his or her fingers to grip the steak weight, and a removable handle sheath covering the handle portion. Alternate embodiments include a handle configuration having one end disconnected from the side portions and an "L" shaped handle configuration.

19 Claims, 6 Drawing Sheets

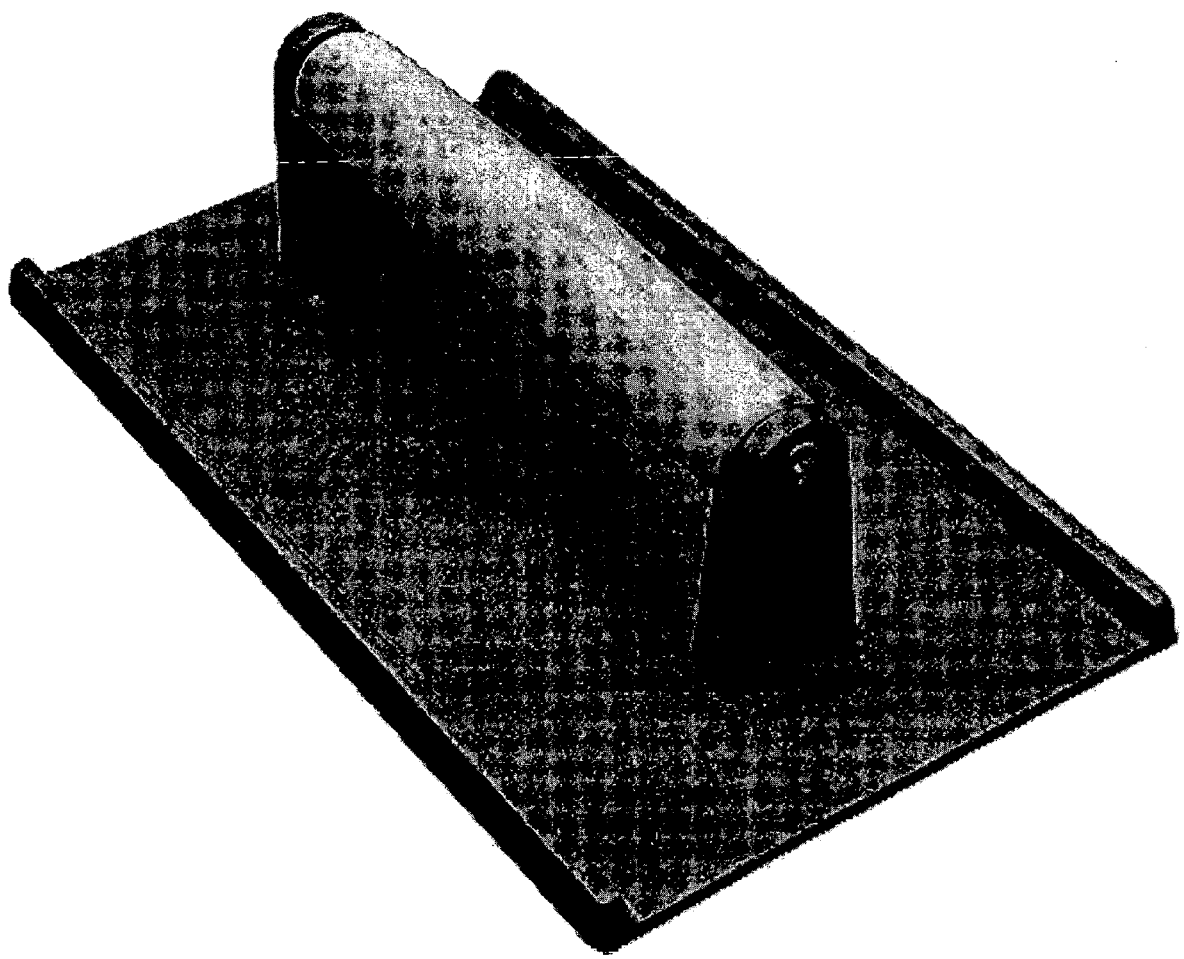
Fig. 1-A
(Prior Art)

STEAK WEIGHT

BACKGROUND OF THE INVENTION

1. Technical Field

The field of this invention is cooking utensils. More specifically, the present invention is a steak weight having a durable construction, improved weight distribution, handling and sanitary qualities.

2. Background

A steak weight is a device used in cooking of meat such as steak cuts, fillets, chops or burgers or patties to provide a downward force on the meat, pressing it against the cooking surface to accelerate cooking of the steak to the desired level, such as, for example "rare," "medium-rare," "medium," "medium-well" or "well done" and also to impart the pattern of the cooking surface onto the meat surface for improved aesthetics of the meat portion when served. For example, when the cooking surface is a grill, the steak weight helps to impart to the meat surface the lines of the grill surface, and cooks can create a cross hash pattern on the meat surface by reorienting the meat on the grill. Steak weights are also used when cooking bacon and other thin meat cuts to prevent the bacon or other thin meat cut from curling up when cooking. In restaurants, where food must be prepared quickly for good customer service, steak weights are very important to quicken the cooking of meat to the desired level and for aesthetic presentation of the meat. The steak weight surface itself can include a pattern or branding that can be imparted to the steak surface by pressing the steak weight down on top of the steak.

Steak weights are usually made of metal such as cast iron or aluminum and usually consist of a rectangular flat bottom plate portion with a couple of brackets protruding upwardly from the top surface of the plate. A wood handle is usually used, consisting of a tubular piece of wood that is disposed horizontally over the center portion of the bottom plate portion, parallel to the bottom plate, and is mounted on each end to the bottom plate's brackets using wood screws driven through the center portion of each end of the handle. The configuration resembles a rectangular trowel, except that steak weights are heavier so as to impart the desired downward force when placed on the top of a steak. As noted above, the bottom plate can have a smooth bottom surface or alternately can have a pattern, such as a waffle pattern or a restaurant logo or brand or other design so that the pattern or design is imparted to the surface of the steak. The sizes and weights of steak weights vary, with the bottom plate surface usually between four to six inches in width and seven to ten inches in length. The weights usually vary from one to five pounds. Usually aluminum is used for steak weights intended for "rare" or "medium" steak cooking and heavier cast iron is used for "medium-well" and "well done" steaks. The typical prior art steak weight is depicted in FIG. 1-A.

Wood is usually the material used for the handle of steak weights because of its ability to insulate and not transmit the heat absorbed by the metal bottom plate when the steak weight is in use over a cooking surface, enabling cooks to handle the steak weight without being burned. However, the use of wood has numerous drawbacks. The handle construction with wood screws driven through the center of the handle ends is not a durable construction, and inevitably the handle breaks off of its mounting after a relatively short period of time due to the exposure to high heat, repeated downward pressing by cooks when using the steak iron, and exposure to water when cleaning the steak weight. The placement of the handle and brackets over the center portion of the bottom plate also causes the weight to be imparted unevenly when cooks press down on the handle, adding to the stress and strain on the wood handle. Additionally, the use of wood handles is not sanitary, as the wood absorbs germs and bacteria over time. It is common to see multiple steak weights in restaurants kitchens missing their handles, making them difficult to use effectively and requiring repeated repair and replacement of the handle portion. Restaurants that serve steaks often have to purchase new steak weights or steak weight handle replacement kits every couple of months, making it a recurring expenditure.

While efforts have been made to improve steak weights by adding a temperature reading component, such as the steak weight described in U.S. Published Patent Application No. 2004/0074398, the above described deficiencies continue to exist. The present invention overcomes these deficiencies and provides a durable, sanitary and better quality utensil for cooking of steaks and other meat cuts mentioned above.

SUMMARY OF THE INVENTION

The present invention is a steak weight having a single-piece triangular design forming a durable metal handle portion with removable handle insulation for greatly improved durability and weight distribution. It also is more sanitary, and the configuration makes the steak weights stackable for easy storage or combination of steak weights when used. Instead of using a wood handle fastened at its ends to brackets on the top center portion of the bottom plate as described above with regard to prior art steak weights, in the present invention the bottom plate portion has two of its opposite ends (either the longer side ends or the shorter side ends) folded or otherwise turned or disposed upwardly and angled inwardly, joining above the central portion of the top of the plate to form a triangle configuration, the ends forming the handle portion, with the upwardly disposed portion on each side having a slot or opening for the user to insert his or her fingers to grip the handle portion. The triangular configuration allows the weight imparted by the user pressing downwardly on the handle to be spread evenly over the meat surface when the steak weight is used. The handle portion which is durable rigid metal without any screws or mounting brackets, is insulated by a removable tubular sheath made of heat resistant material such as rubber or plastic having a low degree of thermal conductivity. Use of a removable heat resistant handle sheath provides the necessary heat resistance so that users can manipulate the steak weight, while providing for improved sanitation in that the portion that comes in contact with the user can be removed for easy cleaning, and can be replaced with minimal expense and effort if it becomes worn, without disabling the steak weight.

BRIEF DESCRIPTION OF THE DRAWINGS

FIG. 1 depicts a side perspective view of the steak weight of the present invention in a preferred embodiment.

DESCRIPTION OF A PREFERRED EMBODIMENT OF THE INVENTION

Figure 18:
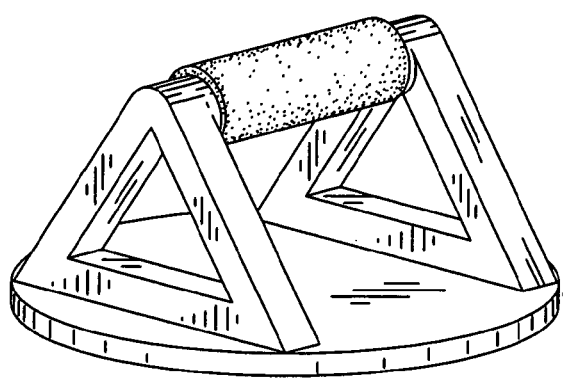
FIG. 18 depicts a side perspective view of the steak weight of the present invention in an alternate embodiment, using a circular bottom plate.
Figure 19:
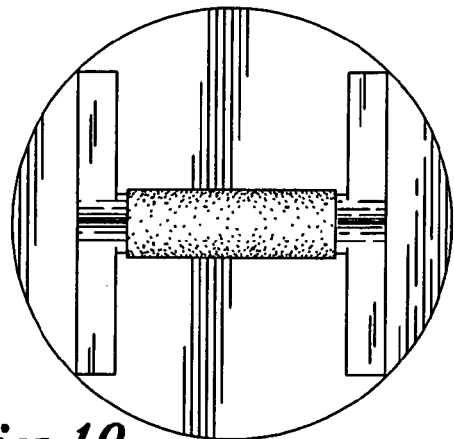
FIG. 19 depicts a top view of the alternate embodiment depicted in FIG. 18.
Figure 20:
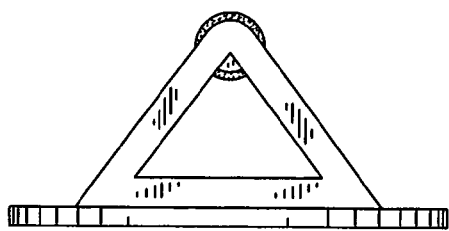
FIG. 20 depicts a front or rear elevational view of the alternate embodiment depicted in FIG. 18.
Figure 21:
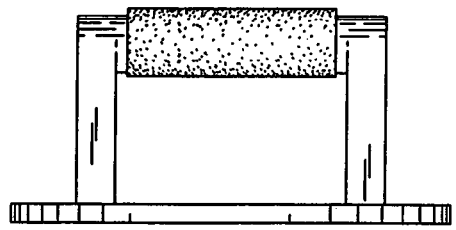
FIG. 21 depicts a side elevational view of the alternate embodiment depicted in FIG. 18.
Figure 22:
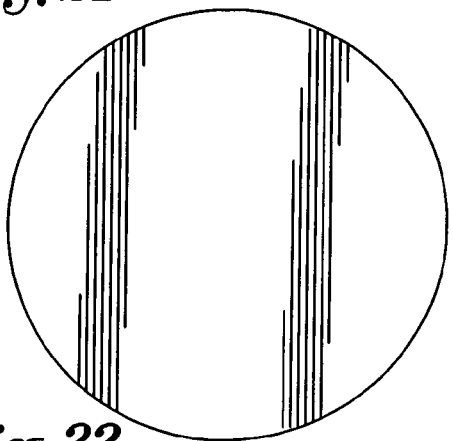
FIG. 22 depicts a bottom view of the alternate embodiment depicted in FIG. 18.

According to a preferred embodiment hereof, the present invention is a steak weight having a single-piece triangular design, comprising a rigid bottom plate portion having two opposite side portions disposed upwardly and inwardly to form a triangular shape, joining above the central portion of said bottom plate portion to form a durable metal handle portion with each of said side portions having a slot or opening for the user of the steak weight to insert his or her fingers to grip the steak weight, and a removable handle sheath covering said handle portion. The configuration, when viewed from the front or rear perspective, resembles an isosceles triangle, with both of the upwardly and inwardly disposed sides preferably being of the same length. The steak weight of the present invention is preferably made of metal such as cast iron, aluminum, stainless steel, and the metal may also be anodized, although other rigid non-toxic, non-flammable materials can be used. The steak weight can be manufactured by various means, such as by injection molding, casting, welding of metal components or by sheet metal forming to the desired shape. The sizes and weights can vary as with existing steak weights. The bottom plate portion can have a rectangular, square, circular or other shape as desired for use with different types of meat cuts. FIG. 18 depicts one such alternate embodiment having a round bottom plate, useful for use with burgers and patties. The handle sheath can be made of rubber, plastic or other material having low thermal conductivity and can be affixed to the metal handle by various means, such as by using adhesive, by heat sealing, or the sheath ends can have a tongue portion designed to be tucked inside a groove along the length of the metal handle portion. The alternate embodiments depicted in FIGS. 6, 12, 18, and 23 can also utilize a tubular handle sheath that can be slipped on and off of the handle portion. The present invention is not limited by the shape size, handle sheath fastening means or manufacturing methods, and other shapes, sizes, sheath fastening and manufacturing means can be utilized. The bottom plate can also have a smooth or patterned surface as desired.

Figure 1:
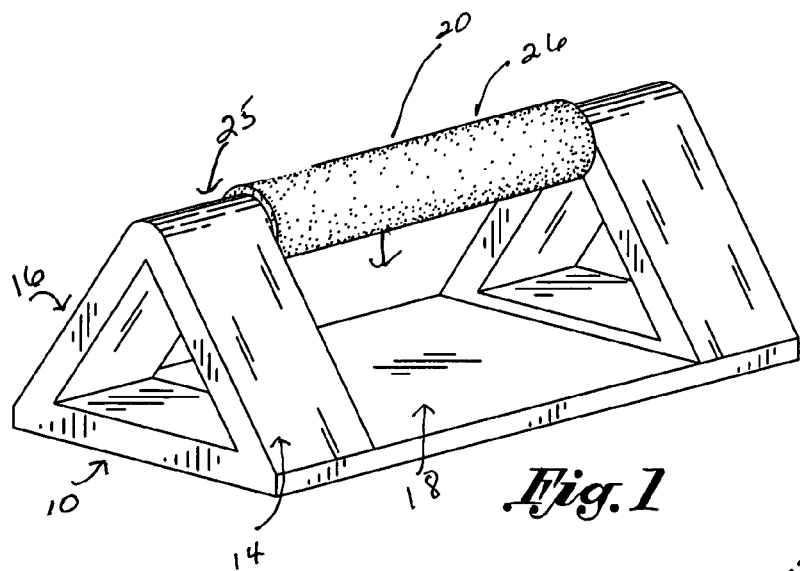
FIG. 1-A depicts a sample prior art steak weight.

Referring now to FIG. 1, which depicts a side perspective view of the steak weight of the present invention, bottom plate 10 has side portions 14 and 16 disposed upwardly and inwardly to form a triangular shape, with the handle portion 25 formed where the side portions 14 and 16 join. Side portions 14 and 16 each have slots or openings 18 and 20 for the steak weight user to insert his or her Fingers. A handle sheath 26 covers the metal handle portion 25. The size of slots or openings 18 and 20 can vary, from beginning at the bottom edges of side portions 14 and 16 and extending upward substantially so as to make the handle portion 25 relatively thin, thereby saving on material costs, or the slots or openings 18 and 20 can be smaller so as to provide increased strength and durability to the overall design.

Figure 6:
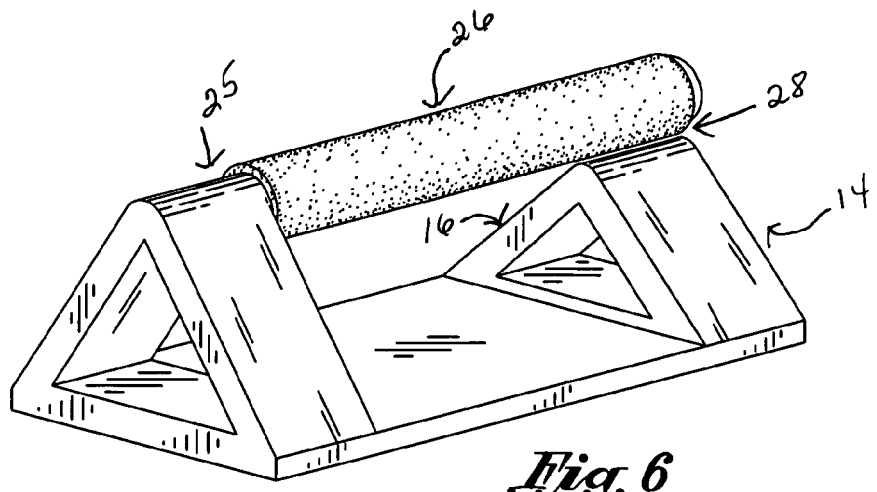
FIG. 6 depicts a side perspective view of the steak weight of the present invention, in an alternate embodiment having one end of the handle portion not connected to the sides, leaving a gap for slipping the rubber handle sheath on and off the handle.
Figure 7:
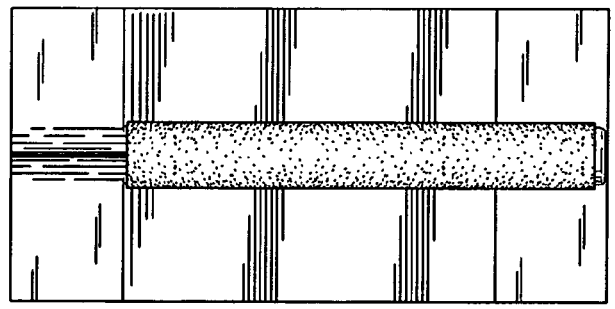
FIG. 7 depicts a top view of the alternate embodiment depicted in FIG. 6.
Figure 8:
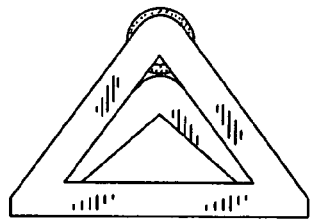
FIG. 8 depicts a front or rear elevational view of the alternate embodiment depicted in FIG. 6.
Figure 9:
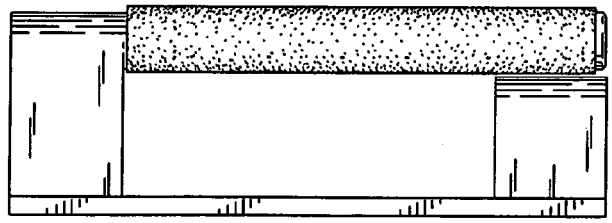
FIG. 9 depicts a side elevational view of the alternate embodiment depicted in FIG. 6.
Figure 11:
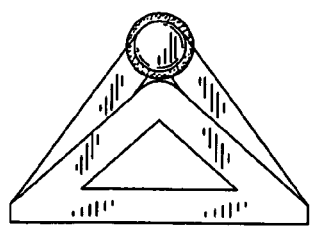
FIG. 11 depicts a front or rear elevational view, opposite to the view in FIG. 8, of the alternate embodiment depicted in FIG. 6.
Figure 10:
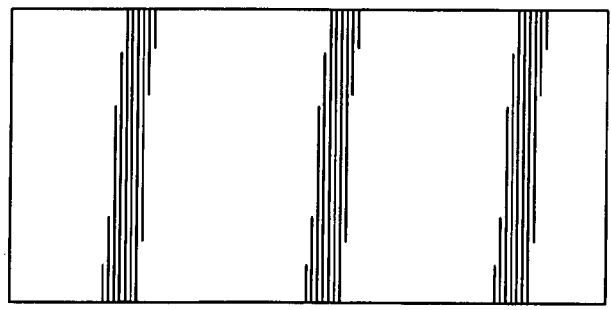
FIG. 10 depicts a bottom view of the alternate embodiment depicted in FIG. 6.

In an alternate embodiment, as depicted in FIG. 6, one end of the handle portion 25 is not connected to the sides 14 and 16, which join underneath to provide support to the handle portion side not connected leaving a gap 28 so that the handle sheath 26 can be tubular and can be slipped on and off through the gap 28 between the sides 14 and 16 and the handle portion 25 end that is not connected to sides 14 and 16. The gap 28 created by such configuration is preferably not more than what is needed to slip the handle sheath 26 on and off, so that when a user presses down on the handle 25 it will still receive support from sides 14 and 16.

Figure 12:
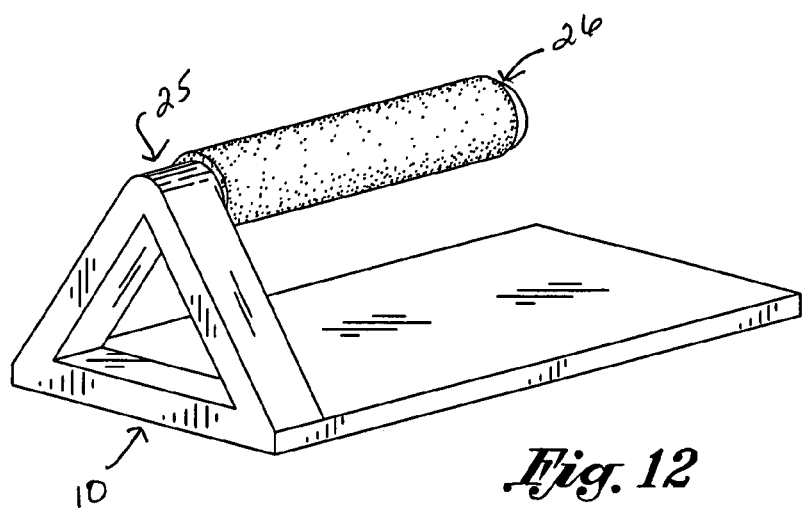
FIG. 12 depicts a side perspective view of the steak weight of the present invention, in an alternate embodiment having the handle portion connected only at one end, without support under the opposite end of the handle portion.
Figure 13:
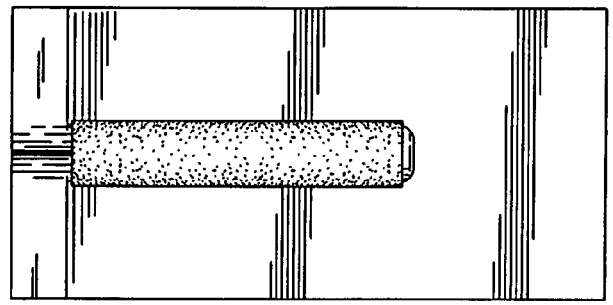
FIG. 13 depicts a top view of the alternate embodiment depicted in FIG. 12.
Figure 14:
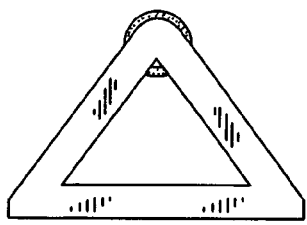
FIG. 14 depicts a front or rear elevational view of the alternate embodiment depicted in FIG. 12.
Figure 15:
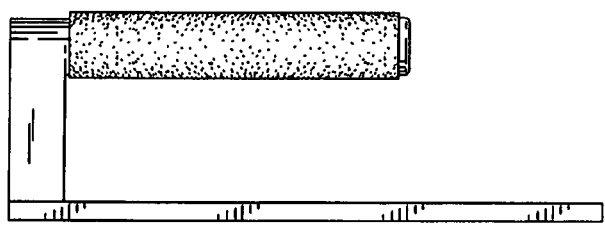
FIG. 15 depicts a side elevational view of the alternate embodiment depicted in FIG. 12.
Figure 17:
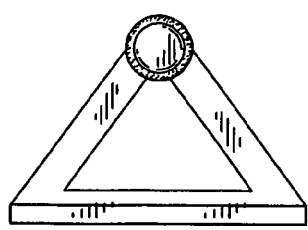
FIG. 17 depicts a front or rear elevational view, opposite to the view in FIG. 14, of the alternate embodiment depicted in FIG. 12.
Figure 16:
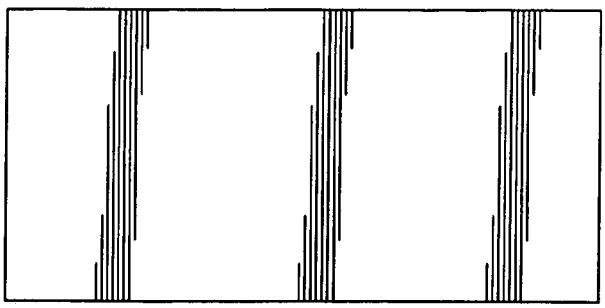
FIG. 16 depicts a bottom view of the alternate embodiment depicted in FIG. 12.
Figure 23:
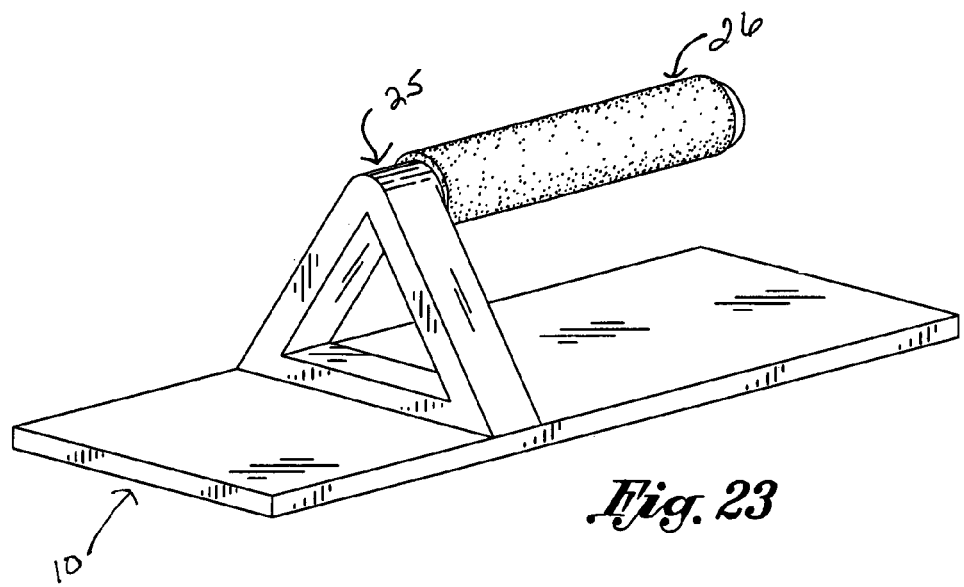
FIG. 23 depicts a side elevational view of an alternate embodiment of the steak weight of the present invention, having on end of the handle portion free and the opposite end of the handle portion connected to the bottom plate closer to the center of the bottom plate than to an end of the bottom plate.
Figure 24:
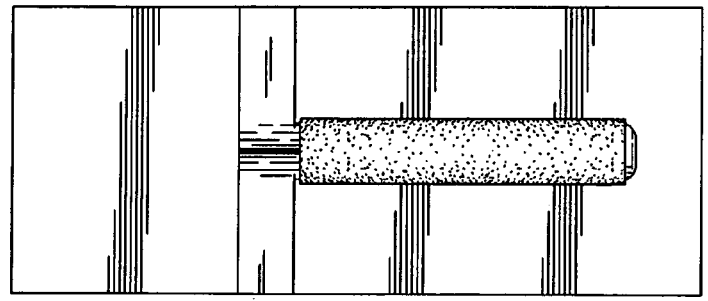
FIG. 24 depicts a top view of the alternate embodiment depicted in FIG. 23.
Figure 25:
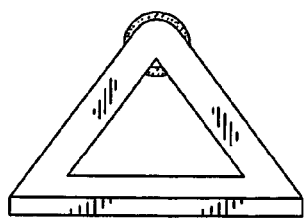
FIG. 25 depicts a front or rear elevational view of the alternate embodiment depicted in FIG. 23.
Figure 26:
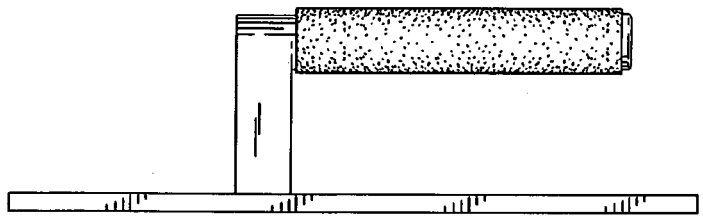
FIG. 26 depicts a side elevational view of the alternate embodiment depicted in FIG. 23.
Figure 28:
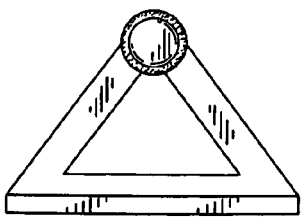
FIG. 28 depicts a front or rear elevational view, opposite to the view in FIG. 25, of the alternate embodiment depicted in FIG. 23.
Figure 27:
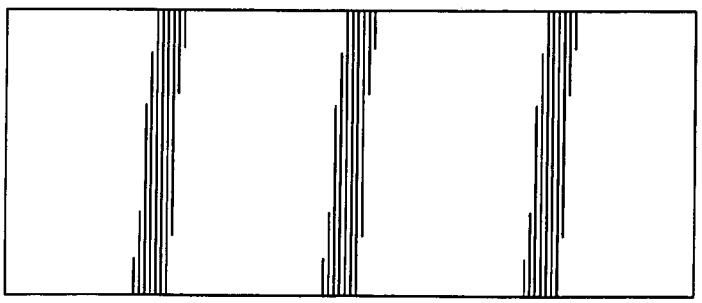
FIG. 27 depicts a bottom view of the alternate embodiment depicted in FIG. 23.

In yet another two embodiments depicted in FIGS. 12 and 23, the handle portion 25 is connected at one of its ends and the opposite end of the handle portion is free, with no supports creating an "L" shaped handle. FIG. 12 shows an embodiment where the handle connection is at one end of bottom plate 10. In FIG. 23, the handle portion 25, is connected to bottom plate 10 further away from the edge of bottom plate 10, preferably at the middle or closer to the middle than from the end of bottom plate 10. This configuration also allows for use of a tubular handle sheath 26 which is easily installable and removable for cleaning and/or replacement as needed.

Figure 2:
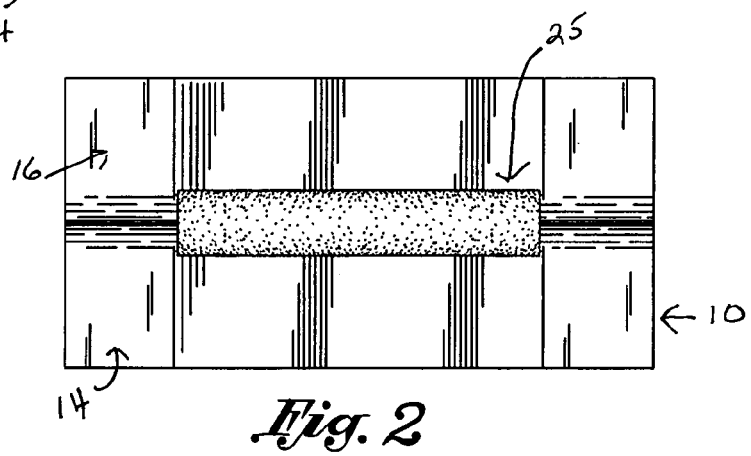
FIG. 2 depicts a top view of the steak weight of the present invention in a preferred embodiment.
Figure 3:
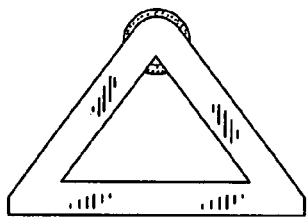
FIG. 3 depicts a rear or front elevational view of the steak weight of the present invention in a preferred embodiment.
Figure 4:
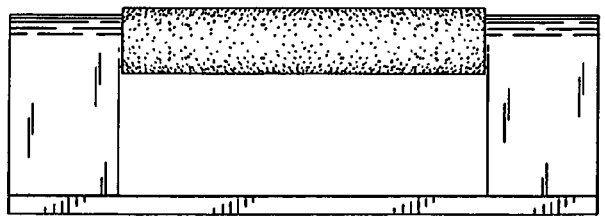
FIG. 4 depicts a side elevational view of the steak weight of the present invention.
Figure 5:
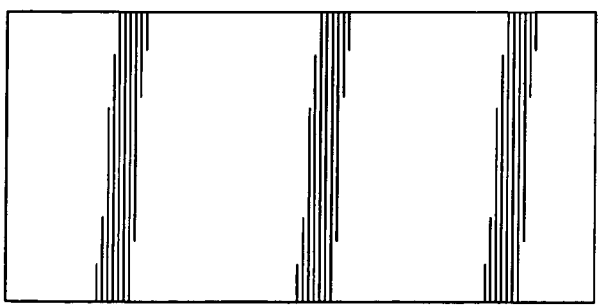
FIG. 5 depicts a bottom view of the steak weight of the present invention in an alternate embodiment having one end of the handle portion that is not connected to the sides.

The front or rear perspective view of the steak weight of the present invention, in a preferred embodiment, is depicted in FIG. 3. The front view is essentially the same as the rear view. FIG. 2, which depicts a top perspective view of a preferred embodiment of the steak weight of the present invention shows how the handle portion 25 is disposed over the middle portion of the bottom plate. The side portions 14 and 16 extend downwardly from the handle portion 25, preferably at substantially equal angles, thereby providing greater durability and more even weight distribution when the user presses down on the handle portion 25.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A steak weight, comprising: a non-toxic, non-flammable rigid bottom plate portion for imparting a downward force on meat when cooking against a cooking surface, said rigid bottom plate portion having a central portion and two opposite edges, a bottom side and a top side, said top side having two opposite side portions disposed upwardly and inwardly relative to each other to form a triangular shape having an open inner area, said two opposite side portions joining above said top side of said central portion of said rigid bottom plate to form a handle portion extending from said juncture of said two opposite side portions.

2. The steak weight of claim 1, further comprising a handle sheath covering said handle portion.

3. The steak weight of claim 1, wherein said bottom plate portion is rectangular in shape.

4. The steak weight of claim 1, wherein said bottom plate portion is circular in shape.

5. The steak weight of claim 1, wherein said bottom plate portion is square in shape.

6. The steak weight of claim 1, wherein said bottom plate portion is made of metal.

7. The steak weight of claim 6, wherein said metal is iron.

8. The steak weight of claim 6, wherein said metal is aluminum.

9. The steak weight of claim 1, wherein said handle sheath is removable.

10. The steak weight of claim 9, wherein said removable handle sheath is made of rubber.

11. The steak weight of claim 1, wherein the bottom surface of said bottom plate portion is smooth.

12. The steak weight of claim 1, wherein the bottom surface of said bottom plate portion has a pattern.

13. The steak weight of claim 1, wherein one end of said handle portion is not connected to said side portions.

14. The steak weight of claim 13, wherein said handle sheath comprises a tubular sheath can be slipped on and off of said handle portion.

15. The steak weight of claim 1, wherein said side portions have substantially the same height.

16. The steak weight of claim 1, wherein said opposite side portions are present only at one end of said bottom plate portion forming an "L" shaped handle that is free at one end.

17. The steak weight of claim 16, wherein said opposite side portions joining to form said handle portion are disposed closer to the center of said bottom plate than to an end of said bottom plate portion.

18. A steak weight having a single-piece triangular shaped design, comprising a rigid bottom plate portion having two opposite side portions disposed upwardly and inwardly, joining above the central portion of said bottom plate portion to form a handle portion with each of said side portions having a slot for the user of the steak weight to insert his or her fingers to grip the steak weight, and a removable handle sheath covering said handle portion, wherein one end of said handle portion is not connected to said side portions.

19. A steak weight having a single-piece triangular shaped design, comprising a rigid bottom plate portion having two opposite side portions disposed upwardly and inwardly, joining above the central portion of said bottom plate portion to form a handle portion and a removable handle sheath covering said handle portion, wherein said opposite side portions are present only at one side of said handle portion, forming an "L" shaped handle portion that is free at one end.

* * * * *